US012626145B2

(12) United States Patent
Park et al.

(10) Patent No.: US 12,626,145 B2
(45) Date of Patent: May 12, 2026

(54) APPARATUS AND METHOD FOR RECOMMENDING COLLABORATIVE FILTERING BASED ON LEARNABLE-TIME ORDINARY DIFFERENTIAL EQUATION

(71) Applicant: UIF (University Industry Foundation), Yonsei University, Seoul (KR)

(72) Inventors: No Seong Park, Seoul (KR); Jeong Whan Choi, Seoul (KR); Jin Sung Jeon, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 1061 days.

(21) Appl. No.: 17/563,726

(22) Filed: Dec. 28, 2021

(65) Prior Publication Data

US 2023/0186105 A1 Jun. 15, 2023

(30) Foreign Application Priority Data

Dec. 13, 2021 (KR) ........................ 10-2021-0177928

(51) Int. Cl.
*G06N 3/08* (2023.01)
*G06F 17/13* (2006.01)
*G06F 17/16* (2006.01)
*G06N 3/126* (2023.01)

(52) U.S. Cl.
CPC ............. *G06N 3/126* (2013.01); *G06F 17/13* (2013.01); *G06F 17/16* (2013.01)

(58) Field of Classification Search
CPC ...... G06N 3/126; G06N 3/0464; G06N 5/022; G06N 3/045; G06N 3/08; G06F 17/13; G06F 17/16
See application file for complete search history.

(56) References Cited

U.S. PATENT DOCUMENTS

2020/0175161 A1* 6/2020 Giaconi ................. G06N 3/084
2020/0312336 A1* 10/2020 Kang ....................... G06N 3/08

FOREIGN PATENT DOCUMENTS

KR 10-2021-0031197 A 3/2021

* cited by examiner

*Primary Examiner* — Brandon S Cole
(74) *Attorney, Agent, or Firm* — Paratus Law Group, PLLC

(57) ABSTRACT

A collaborative filtering recommending apparatus includes an initial-embedding generation module configured to generate first and second initial embeddings; a dual co-evolving ordinary differential equation module comprising first and second ordinary differential equation processing members which repeat, for a specific time, a process of receiving first and second previous embeddings, respectively, and outputting first and second subsequent embeddings, respectively, through mutual influence as a learning time elapses, the first and second previous embeddings initially corresponding to the first and second initial embeddings, respectively; and a final-embedding generation module configured to generate a first final embedding by cumulative summing the first previous and subsequent embeddings, and to generate a second final embedding by cumulative summing the second previous and subsequent embeddings.

14 Claims, 10 Drawing Sheets

| ODE Solver | Inside the ODEs | Outside the ODEs |
|---|---|---|
| Explicit Euler (without the red parts in Eq. (10)) | Linear Connection | Layer Combination |
| Explicit Euler (with the red parts in Eq. (10)) | Residual Connection | |
| RK4 | DenseNet or FractalNet | |
| Adams-Moulto | Implicit Connection | |
| DOPRI | Adaptive Connection | |

FIG. 11

Algorithm 1: How to train $E_0^u$ and $E_0^p$

Input: Rating matrix $R$

1  Initialize $E_0^u$ and $E_0^p$;

2  while *the BPR loss L is not converged* do

3      Update $E_0^u$ with $\frac{dL}{du(0)}$;

4      Update $E_0^p$ with $\frac{dL}{dp(0)}$;

5      Update $t_i$ for all $i$;

6  return $E_0^u$ and $E_0^p$;

FIG. 12

| Name | #Users | #Items | #Interactions |
|------|--------|--------|---------------|
| Gowalla | 29,858 | 40,981 | 1,027,370 |
| Yelp2018 | 31,668 | 38,048 | 1,561,406 |
| Amazon-Book | 52,643 | 91,599 | 2,984,108 |

FIG. 13

| Dataset Method | Gowalla | | Yelp2018 | | Amazon-Book | |
|----------------|---------|--------|----------|--------|-------------|--------|
| | Recall | NDCG | Recall | NDCG | Recall | NDCG |
| MF | 0.1291 | 0.1109 | 0.0433 | 0.0354 | 0.0250 | 0.0196 |
| NeuMF | 0.1399 | 0.1212 | 0.0451 | 0.0363 | 0.0258 | 0.0200 |
| CMN | 0.1405 | 0.1221 | 0.0475 | 0.0369 | 0.0267 | 0.0218 |
| HOP-Rec | 0.1399 | 0.1214 | 0.0517 | 0.0428 | 0.0309 | 0.0232 |
| GC-MC | 0.1395 | 0.1204 | 0.0462 | 0.0379 | 0.0288 | 0.0224 |
| PinSage | 0.1380 | 0.1196 | 0.0471 | 0.0393 | 0.0282 | 0.0219 |
| Mult-VAE | 0.1641 | 0.1335 | 0.0584 | 0.0450 | 0.0407 | 0.0315 |
| GRMF | 0.1477 | 0.1205 | 0.0571 | 0.0462 | 0.0354 | 0.0270 |
| GRMF-Norm | 0.1557 | 0.1261 | 0.0561 | 0.0454 | 0.0352 | 0.0269 |
| NGCF | 0.1570 | 0.1327 | 0.0579 | 0.0477 | 0.0344 | 0.0263 |
| LR-GCCF | 0.1518 | 0.1259 | 0.0574 | 0.0349 | 0.0341 | 0.0258 |
| LightGCN | 0.1830 | 0.1554 | 0.0649 | 0.0530 | 0.0411 | 0.0315 |
| LT-OCF | 0.1875 | 0.1574 | 0.0671 | 0.0549 | 0.0442 | 0.0341 |

(a) Training curve of loss (b) Training curve of recall (c) Training curve of NDCG (d) Training curve of $t_i$

FIG. 15

(a) Training curve of loss (b) Training curve of recall (c) Training curve of NDCG (d) Training curve of $t_i$ (a) Training curve of loss (b) Training curve of recall (c) Training curve of NDCG (d) Training curve of $t_i$

APPARATUS AND METHOD FOR RECOMMENDING COLLABORATIVE FILTERING BASED ON LEARNABLE-TIME ORDINARY DIFFERENTIAL EQUATION

ACKNOWLEDGEMENT

National R&D Project Supporting the Present Invention
   Assignment number: 1711126082
   Project number: 2020-0-01361-002
   Department name: Ministry of Science and Technology Information and Communication
   Research and management institution: Information and Communication Planning and Evaluation Institute
   Research project name: Information and Communication Broadcasting Innovation Talent Training(R&D)
   Research project name: Artificial Intelligence Graduate School Support(Yonsei University)
   Contribution rate: 1/1
   Organized by: Yonsei University Industry-Academic Cooperation Foundation
   Research period: 20200101 to 20211231

CROSS-REFERENCE TO RELATED APPLICATION

This application claims priority to Korean Patent Application No. 10-2021-0177928 (filed on Dec. 13, 2021), which is hereby incorporated by reference in its entirety.

BACKGROUND

The present disclosure relates to a learning-based recommendation technology and, more particularly, to an apparatus and method for recommending learnable-time ordinary differential equation based collaborative filtering, which redesign a linear GCN based on a neural ODE, thus improving a collaborative filtering performance.

Collaborative filtering (CF), which is to predict users' preferences from patterns, is a long-standing research subject in the field of recommender systems. Further, it is common to learn user and product embedding vectors and calculate their dot-products for recommendation. Matrix factorization is one approach, which is well-known in the field of the recommender system. There have also been proposed various other application examples.

Recently, attention is being focused on graph convolutional networks (GCNs) for the purpose of collaborative filtering. GCNs have been proposed to process not only CF-related graphs but also other general graphs. GCNs may be mainly categorized into two types: spectral GCNs and spatial GCNs. GCNs for CF may fall into the first category due to its appropriateness for CF. However, there is still needed research on what is the optimal GCN architecture for CF.

Neural ordinary differential equations (NODEs) may be to learn implicit differential equations from data. NODEs may calculate $$h(t_1) = h(t_0) + \int_{t_0}^{t_1} f(h(t), t; \theta_f)dt,$$

where $f$ is a neural network parameterized by $\theta_f$ that approximates $$\frac{dh(t)}{dt},$$

to derive $h(t_1)$ from $h(t_0)$, when $t_1 > t_0$. It is to be noted that $\theta_f$ is trained from data, in other words, $$\frac{dh(t)}{dt}$$

is trained from data. A variable t may be called as a time variable, which represents the layer concept of neural networks. It is to be noted that t may be a non-negative integer in conventional neural networks, whereas it may be any non-negative real number in NODEs. In this regard, NODEs may be considered as continuous generalizations of neural networks.

Various ODE solvers may solve the integral problem, and may generalize various neural network architectures. For instance, the general form of residual connection may be expressed as $h(t+1)=h(t)+f(h(t); \theta)$, which may be identical to the explicit Euler method to solve ODE problems.

CITED DOCUMENT

Patent Document

Korean Patent Laid-Open Publication No. 10-2021-0031197 (Mar. 19, 2021)

SUMMARY

In view of the above, the present disclosure provides an apparatus and method for recommending learnable-time ordinary differential equation based collaborative filtering, which redesign a linear GCN based on a neural ODE, thus improving a collaborative filtering performance.

The present disclosure provides a collaborative filtering recommending apparatus based on a learnable-time ordinary differential equation, the apparatus including an initial-embedding generation module configured to generate first and second initial embeddings; a dual co-evolving ordinary differential equation module including first and second ordinary differential equation processing members which repeat, for a specific time, a process of receiving first and second previous embeddings, respectively, and outputting first and second subsequent embeddings, respectively, through mutual influence as a learning time elapses, the first and second previous embeddings initially corresponding to the first and second initial embeddings, respectively; and a final-embedding generation module configured to generate a first final embedding by cumulative summing the first previous and subsequent embeddings, and to generate a second final embedding by cumulative summing the second previous and subsequent embeddings.

The dual co-evolving ordinary differential equation module may output a user embedding matrix (u(t)) at a specific point of the learnable-time as the first subsequent embedding.

The dual co-evolving ordinary differential equation module may output a product embedding matrix (p(t)) at a specific point of the learnable-time as the second subsequent embedding.

The dual co-evolving ordinary differential equation module may construct a set of co-evolving ordinary differential equations with the user embedding matrix and the product embedding matrix.

The dual co-evolving ordinary differential equation module may output a plurality of user embedding matrixes ($u(t_1)$, $u(t_2)$, . . . , $u(t_n)$) and a plurality of product embedding matrixes ($p(t_1)$, $p(t_2)$, . . . , $p(t_n)$) at a plurality of discrete times which is settable by a user.

The dual co-evolving ordinary differential equation module may construct each of first and second ordinary differential equations as a non-parameterized and non-time-dependent ordinary differential equation.

The final-embedding generation module may generate the first final embedding by weighted summing a plurality of user matrixes generated at a plurality of discrete times, and may generate the second final embedding by weighted summing a plurality of product matrixes generated at the plurality of discrete times.

The present disclosure provides a collaborative filtering recommending method based on a learnable-time ordinary differential equation, the method including an initial embedding generation step of generating first and second initial embeddings; a dual co-evolving ordinary differential equation step of repeating, for a specific time, a process of receiving first and second previous embeddings, respectively, and outputting first and second subsequent embeddings, respectively, through mutual influence as a learning time elapses, through first and second ordinary differential equation processing members, the first and second previous embeddings initially corresponding to the first and second initial embeddings, respectively; and a final-embedding generation step of generating a first final embedding by cumulative summing the first previous and subsequent embeddings, and generating a second final embedding by cumulative summing the second previous and subsequent embeddings.

The dual co-evolving ordinary differential equation step may include outputting a user embedding matrix ($u(t)$) at a specific point of the learnable-time as the first subsequent embedding.

The dual co-evolving ordinary differential equation step may include outputting a product embedding matrix ($p(t)$) at a specific point of the learnable-time as the second subsequent embedding.

The dual co-evolving ordinary differential equation step may include constructing a set of co-evolving ordinary differential equations with the user embedding matrix and the product embedding matrix.

The dual co-evolving ordinary differential equation step may include outputting a plurality of user embedding matrixes ($u(t_1)$, $u(t_2)$, . . . , $u(t_n)$) and a plurality of product embedding matrixes ($p(t_1)$, $p(t_2)$, . . . , $p(t_n)$) at a plurality of discrete times which is settable by a user.

The dual co-evolving ordinary differential equation step may include constructing each of first and second ordinary differential equations as a non-parameterized and non-time-dependent ordinary differential equation.

The final embedding generation step may include generating the first final embedding by weighted summing a plurality of user matrixes generated at a plurality of discrete times, and generating the second final embedding by weighted summing a plurality of product matrixes generated at the plurality of discrete times.

The present disclosure may have the following effects. Since a specific embodiment does not mean that it should include all of the following effects or only the following effects, it should not be understood that the scope of the present disclosure is limited thereto.

The apparatus and method for recommending learnable-time ordinary differential equation based collaborative filtering according to the present disclosure can redesign a linear GCN based on a neural ODE, thus improving a collaborative filtering performance.

The apparatus and method for recommending learnable-time ordinary differential equation based collaborative filtering according to the present disclosure can be useful to use user behavior in domains with structured information, such as social networks, item knowledge graphs, and context-aware recommendations.

The apparatus and method for recommending learnable-time ordinary differential equation based collaborative filtering according to the present disclosure can integrate a user-item graph and an item knowledge graph to establish knowledge-aware connection between the user and the item, thus contributing to a user's decision-making process when selecting an item.

BRIEF DESCRIPTION OF THE DRAWINGS

FIG. 10 is a diagram illustrating inside and outside connections in various solvers.

FIG. 11 is a diagram illustrating a training algorithm according to the present disclosure.

FIG. 12 is a diagram illustrating a dataset used in an experiment according to the present disclosure.

FIG. 13 is a diagram illustrating a performance comparison experimental result between models.

FIG. 15 is a diagram illustrating an experimental result for a Yelp2018 dataset.

DETAILED DESCRIPTION

Figure 1:
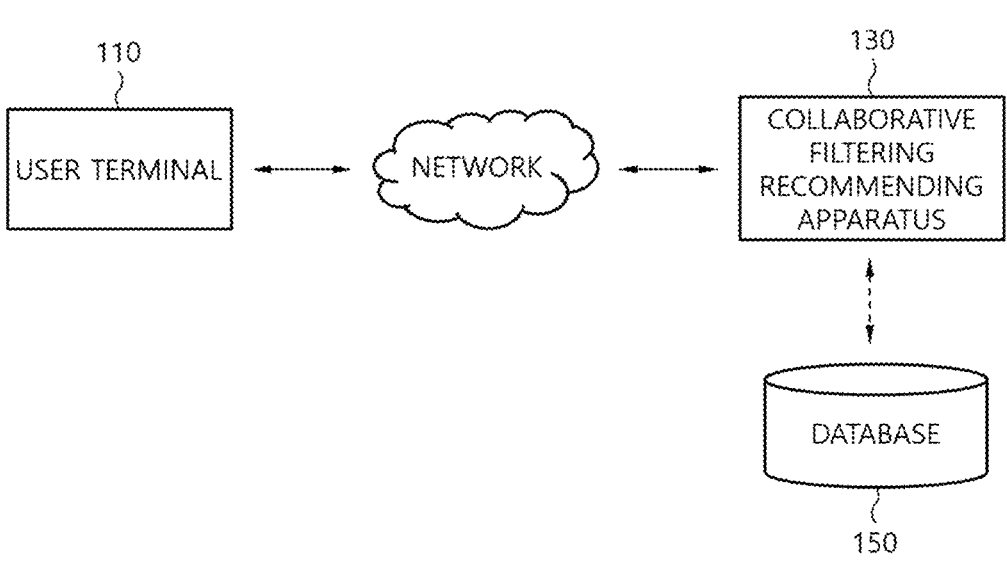
FIG. 1 is a diagram illustrating a collaborative filtering recommender system according to the present disclosure.

Since specific structural or functional descriptions in the embodiments of the present disclosure are only for description of the embodiments of the present disclosure, the scope of the present disclosure should not be construed as being limited to the embodiments described in the specification or application. Since the present disclosure may be embodied in many different forms, this should be construed as covering modifications, equivalents or alternatives falling within ideas and technical scopes of the present disclosure. Further, since the objects or effects proposed in the present disclosure do not mean that a specific embodiment should cover all or only the effects, it should not be understood that the scope of the present disclosure is limited thereto.

The meaning of the terms described in this application should be understood as follows.

It will be understood that the terms "first", "second", etc. may be used to distinguish one component from another component, but these components should not be limited by these terms. For instance, a first component could be termed a second component without departing from the teachings of the present disclosure. Similarly, the second component could also be termed the first component.

It will be understood that when a component is referred to as being "connected" to another component, it may be directly connected to the other component or intervening components may be present therebetween. In contrast, it should be understood that when a component is referred to as being "directly connected" to another component, there are no intervening components present. Other expressions that explain the relationship between components, such as "between", "directly between", "adjacent to" or directly adjacent to" should be construed in the same way.

In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, or combinations thereof, but do not preclude the presence or addition of one or more other features, integers, steps, operations, elements, components, or combinations thereof.

In each of steps, an identification sign (e.g. "a", "b", "c", etc.) is used for convenience of description, and the identification sign does not describe the order of the steps. The steps may occur in a different order from the stated order unless the context clearly dictates a specific order. In other words, the steps may occur in the same order as specified, may be performed substantially simultaneously, or may be performed in the reverse order.

The present disclosure may be implemented as computer-readable codes on a computer-readable recording medium. The computer-readable recording medium includes all types of recording devices in which data readable by a computer system is stored. Examples of the computer-readable recording medium include, but are not limited to, ROM, RAM, CD-ROM, magnetic tape, floppy disk, and optical data storage device. Furthermore, the computer-readable recording medium may be distributed in computer systems connected by a network, and computer-readable codes may be stored and executed in a distributed manner.

Unless otherwise defined, all terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

First, a neural ODE (NODE) will be described.

The NODE may calculate $h(t_{i+1})$ from $h(t_i)$ by solving the Riemann integral problem expressed as in the following Equation 1.

$$h(t_{i+1}) = h(t_i) + \int_{t_i}^{t_{i+1}} f(h(t), t; \theta_f)dt \qquad \text{[Equation 1]}$$

where the ODE function $f$ parameterized by $\theta_f$ is a neural network to approximate the time-derivative of h, i.e., $$\dot{h} \overset{def}{=} \frac{dh(t)}{dt}.$$

To solve the problem, existing ODE solvers may be used. For instance, they may be the explicit Euler method, the Dormand-Prince (DOPRI) method, and so forth.

Figure 6:
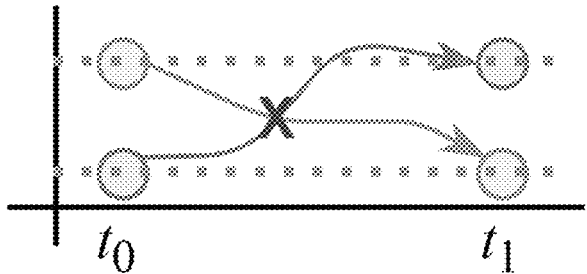
FIG. 6 is a diagram illustrating mapping in NODE.

$\phi_t : \mathbb{R}^{dim(h(t_0))} \to \mathbb{R}^{dim(h(t_1))}$ may be defined as a mapping function from $t_0$ to $t_1$ created by the following Equation 1. $\phi_t$ may become a homeomorphic mapping. $\phi_t$ may be continuous and bijective, and $\phi_t^{-1}$ may also be continuous for $t \in [0, T]$, where T is the last value in the time domain. From this characteristic, the following proposition may be easily proved. That is, since the topology of the input space of $\phi_t$ is maintained in the output space, the trajectories crossing each other may not be learned by NODEs (see FIG. 6).

While maintaining the topology, NODEs may perform downstream tasks and the robustness to adversarial attacks and out-of-distribution inputs may be enhanced. When there is no abundant information, the characteristic for NODEs may be suitable for learning reliable user/product representations, i.e., embeddings.

Instead of the backpropagation method, the adjoint sensitivity method which is already proved in efficiency and theoretical correctness may be adopted. After defining $$a_h(t) = \frac{dL}{dh(t)}$$

for a task-specific loss L, the gradient of loss for model parameters may be calculated using another reverse-mode integral as in the following Equation 1-1.

$$\nabla_{\theta_f} L = \frac{dL}{d\theta_f} = - \int_{t_m}^{t_0} a_h(t)^T \frac{\partial f(h(t), t; \theta_f)}{\partial \theta_f} dt \qquad \text{[Equation 1-1]}$$

The adjoint sensitivity method may be modified to design the learning method according to the present disclosure. In other words, both user/product embeddings and time points $\{t_1, t_2, \dots\}$ may be learned to construct a layer combination using the modified method.

Figure 7:
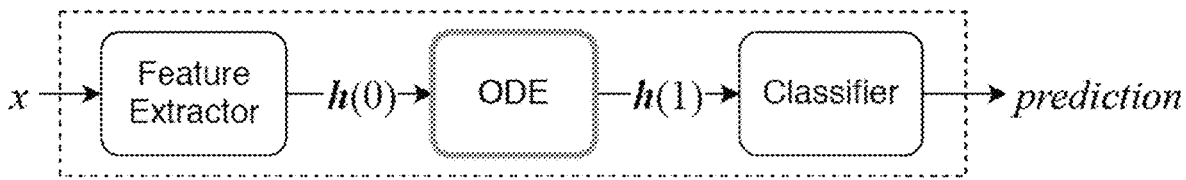
FIG. 7 is a diagram illustrating a general architecture of the NODE.
Figure 8:
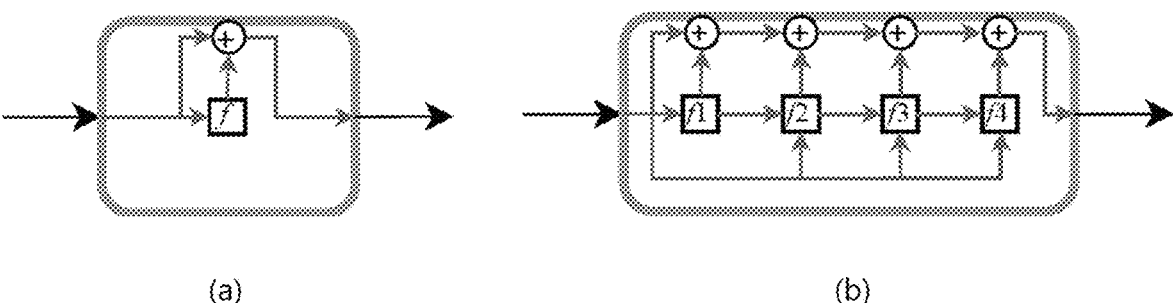
FIG. 8 is a diagram illustrating the specific step of an explicit Euler method and RK4.
Figure 9:
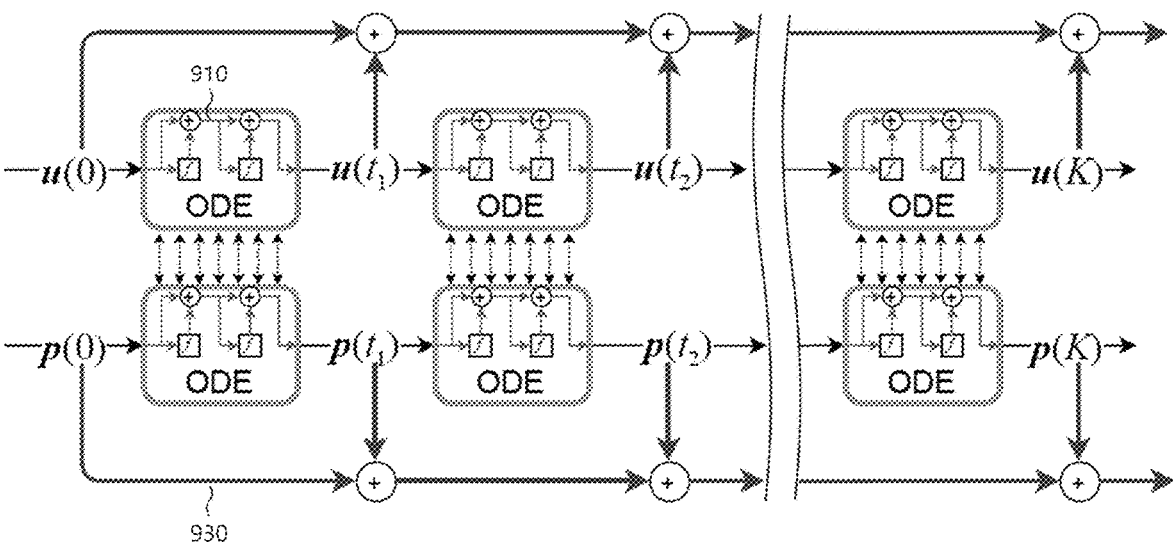
FIG. 9 is a diagram illustrating dual co-evolving ODEs according to the present disclosure.

Meanwhile, NODEs may reduce the required number of parameters when building neural networks, and may interpret the time variable t as continuous, which is discrete in conventional neural networks. FIG. 7 shows the typical architecture of NODEs. When a downstream classification task is assumed in FIG. 7, a feature extraction layer which provides h(0) may be included, and h(1) may be calculated by the above-described method. In the present disclosure, however, the architecture of FIG. 5B having only the dual co-evolving ODEs may be used, because it is applied to not a classification task but a collaborative filtering task.

Hereinafter, the analogy between residual/dense connections and ODE solvers will be described. ODE solvers may discretize the time variable t and convert an integral into many steps of additions. For instance, the explicit Euler method may be expressed as in the following Equation 2 in a specific step.

$$h(t+s) = h(t) + s \cdot f(h(t), t; \theta_f) \qquad \text{[Equation 2]}$$

where s, which is usually smaller than 1, is a configured step size of the Euler method. Equation 2 may be identical to a residual connection when s=1.

Other ODE solvers may use more complicated methods to update h(t+s) from h(t). For instance, the fourth-order Runge-Kutta (RK4) method may use the method expressed in the following Equation 3.

$$h(t+s) = h(t) + \frac{s}{6}(f_1 + 2f_2 + 2f_3 + f_4)$$ [Equation 3]

where $f_1 = f(h(t), t; \theta_f)$, $f_2 = f\left(h(t) + \frac{s}{2}f_1, t + \frac{s}{2}; \theta_f\right)$, $$f_3 = f\left(h(t) + \frac{s}{2}f_2, t + \frac{s}{2}; \theta_f\right) f_4 = f(h(t) + sf_3, t + s; \theta_f).$$

It is also known that dense convolutional networks (DenseNets) and fractal neural networks (FractalNet) are similar to RK4 (as so are residual networks to the explicit Euler method). For simplicity but without loss of generality, however, the explicit Euler method may be used as an example.

Another ODE solver is the implicit Adams-Moulto method which is expressed as in the following Equation 4:

$$h(t+s) = h(t) + \frac{s}{24}(9f_1 + 19f_2 - 5f_3 + f_4)$$ [Equation 4]

where $f_1 = f(h(t+s), t+s; \theta_f)$, $f_2 = f(h(t), t; \theta_f)$, $$f_3 = f(h(t-s), t-s; \theta_f), f_4 = f(h(t-2s), t-2s; \theta_f).$$

This implicit method may be different from the aforementioned explicit solvers in that i) it uses past multi-step history, i.e., $f_3$ and $f_4$, to calculate a more robust derivative term and ii) it uses $f_1$ in conjunction with the multi-step history. At the moment of time t, however, it is before calculating h(t+s) so evaluating $f_1$ may not be done in a simple way. It is possible to use methods, such as Newton's method, to calculate h(t+s). The use of $f_1$ is called implicit in the field of numerical methods to solve ODEs. For experiments, all advanced solvers may be considered, which may formulate the graph-based CF as the dual co-evolving ODEs.

Hereinafter, the collaborative filtering (CF) will be described.

$$E_0^u$$

$\in \mathbb{R}^{N \times D}$ and $$E_0^p$$

$\in \mathbb{R}^{M \times D}$ may be the initial user and product embeddings, respectively. There may be N users and M products, and embeddings may be D dimensions. Early CF methods include matrix factorization, SVD++, neural attentive item similarity, and so on. All these methods may utilize user-product interaction history Because user-product relationships may be represented by bipartite graphs, GCNs are recently adopted for CF. NGCF is one of the most popular GCN-based CF methods. It may use non-linear activations and transformation matrices to transform from the user embedding space to the product embedding space, and vice versa. At each layer, user and product embeddings may be extracted as in the layer combination.

However, it may concatenate them instead of taking their sum. Its overall architecture may be similar to the standard GCN. However, the non-linear activation and the embedding space transformation may not be necessary in CF due to the environmental dissimilarity between general graph-based downstream tasks and CF. That is, other graph-based tasks may include abundant information, e.g., high-dimensional node features. However, CF may frequently include a bipartite graph without additional features. Even worse, the graph may be sparse in CF. Due to the difference, non-linear GCNs are easily overfitted to training graphs and their testing accuracy is mediocre in many cases even with various countermeasures preventing it. Further, transforming between user and product embedding spaces may not be helpful in CF.

After NGCF, several methods have been proposed. Among them, in particular, one recent graph-based method, called LightGCN, may show state-of-the-art accuracy in many datasets. In addition, it may show that linear GCNs with layer combination work the best among many design choices. Its linear graph convolutional layer may be defined as in the following Equation 5.

$$E_k^u = \tilde{A}_{u \to p} E_{k-1}^p$$ [Equation 5]

$$E_k^p = \tilde{A}_{p \to u} E_{k-1}^u$$

where $\tilde{A}_{p \to u} \in [0, 1]^{M \times N}$ is a normalized adjacency matrix of the graph from products to users and $\tilde{A}_{u \to p} \in [0, 1]^{N \times M}$ is also defined in the same way but from users to products. LightGCN may learn the initial embeddings, denoted by $$E_0^u \text{ and } E_0^p,$$

and may use the layer combination, which may be expressed as in the following Equation 6.

$$E_{final}^u = \sum_{i=0}^{K} w_i E_i^u$$ [Equation 6]

$$E_{final}^p = \sum_{i=0}^{K} w_i E_i^p$$

where K is the number of layers, $w_i$ is a coefficient, and $$E_{final}^u \text{ and } E_{final}^p$$

are the final embeddings.

The CF methods, including the method according to the present disclosure, LightGCN, and so on, may learn the initial embeddings of users and products (and model parameters if any). After a series of K graph convolutional layers, a graph-based CF algorithm may derive $$E_{final}^u \text{ and } E_{final}^p$$

and may use their dot products to predict $r_{u,i}$, which is a rating (or ranking score) by a user u to product i, for all u, i. Typically, the initial embedding vectors (and model parameters if any) in the field of CF may be trained using the Bayesian personalized ranking (BPR) loss expressed as in the following Equation 7.

$$L = -\sum_{u=1}^{N} \sum_{i \in N_u} \sum_{j \notin N_u} \ln\sigma(r_{u,i} - r_{u,j}) + \lambda \|E_0^u \odot E_0^p\|^2 \quad \text{[Equation 7]}$$

where $\mathcal{N}_u$ is a set of products adjacent to u, $\sigma$ is a non-linear activation, and $\odot$ means a concatenation operator. At this time, the softplus may be used for $\sigma$.

Hereinafter, the linear GCN and the Newton's Law of Cooling will be described.

As a matter of fact, the above Equation 5 may be similar to the heat equation, which describes the law of thermal diffusive processes, i.e., Newton's Law of Cooling. The heat equation may be expressed as in the following Equation 8.

$$\frac{dH_t}{dt} = -\Delta H_t \quad \text{[Equation 8]}$$

where $\Delta$ is the Laplace operator and $H_t$ is a column vector which contains the temperatures of the nodes in a graph or a discrete grid at time t. The Laplace operator $\Delta$ is simply a matrix multiplication with the Laplacian matrix or the normalized adjacency matrix.

Therefore, the right-hand side of the above Equation 5 may be expressed as in the above Equation 8, if each element of $$E_i^u \text{ and } E_i^p$$

is interpreted as a temperature value. Since $$E_i^u \text{ and } E_i^p$$

are D-dimentional vectors, it may be considered that D different diffusive processes exist in the above Equation 5. In this regard, LightGCN models discrete thermal diffusive processes, whereas the method according to the present disclosure describes continuous thermal diffusive processes.

Hereinafter, the apparatus and method for recommending the collaborative filtering according to the present disclosure will be described in detail with reference to FIGS. 1 to 11.

FIG. 1 is a diagram illustrating a collaborative filtering recommender system according to the present disclosure.

Referring to FIG. 1, the collaborative filtering recommender system 100 may be configured to execute the collaborative filtering recommending method based on the learnable-time ordinary differential equation according to the present disclosure. To this end, the collaborative filtering recommender system 100 may include a user terminal 110, a collaborative filtering recommending apparatus 130, and a database 150.

The user terminal 110 may correspond to a terminal device operated by a user. For example, the user may process operations related to data generation and learning through the user terminal 110. In the embodiment of the present disclosure, the user may be understood as one or more users, and a plurality of users may be divided into one or more user groups.

Further, the user terminal 110 may be one device which forms the collaborative filtering recommender system 100, and may correspond to a computing device which is operated in conjunction with the collaborative filtering recommending apparatus 130. For example, the user terminal 110 may be implemented as a smart phone, a laptop computer, or a computer which is connected to the collaborative filtering recommending apparatus 130 to be operable, but, without being limited thereto, may be implemented as various devices including a tablet PC. Further, the user terminal 110 may install and execute a dedicated program or application (or, app) to operate in conjunction with the collaborative filtering recommending apparatus 130.

The collaborative filtering recommending apparatus 130 may be implemented as a server corresponding to a computer or a program which performs the collaborative filtering recommending method based on the learnable-time ordinary differential equation according to the present disclosure. Further, the collaborative filtering recommending apparatus 130 may be connected to the user terminal 110 through a wired network or a wireless network such as Bluetooth, WiFi, or LTE, and may transmit/receive data to and from the user terminal 110 through the network. Furthermore, the collaborative filtering recommending apparatus 130 may be connected and operated with an independent external system (not shown in FIG. 1) to perform a related operation.

The database 150 may correspond to a storage device which stores various pieces of information required in the operating process of the collaborative filtering recommending apparatus 130. For example, the database 150 may store information about learning data used in a learning process, and may store information about a training model or a training algorithm. The database may, without being limited thereto, store information collected or processed in various forms while the collaborative filtering recommending apparatus 130 performs the collaborative filtering recommending method based on the learnable-time ordinary differential equation according to the present disclosure.

Although FIG. 1 shows that the database 150 is a device independent from the collaborative filtering recommending apparatus 130, the database as a logical storage device may be included in the collaborative filtering recommending apparatus 30 without being limited thereto.

Figure 2:
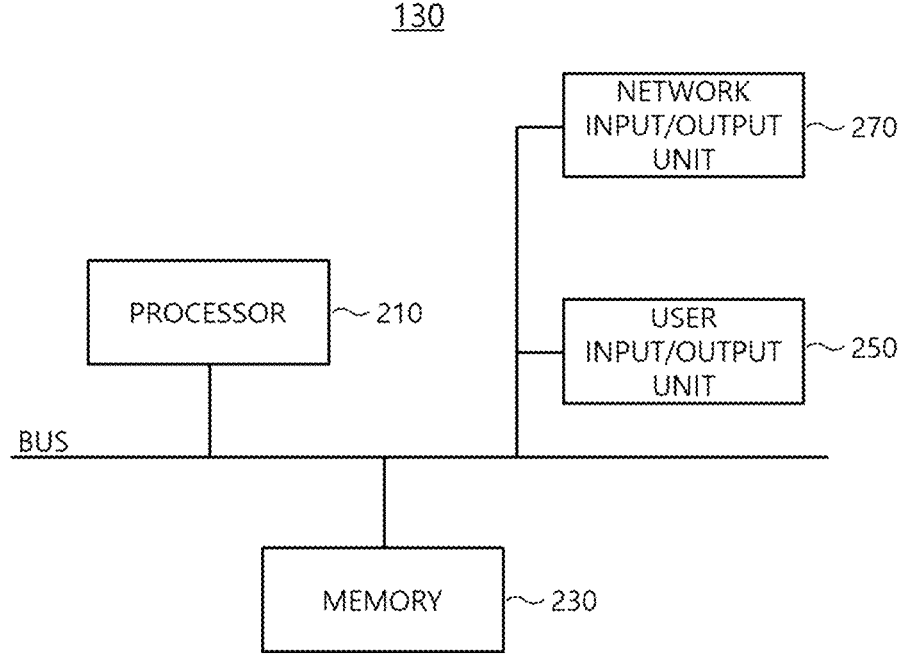
FIG. 2 is a diagram illustrating the system configuration of a collaborative filtering recommending apparatus according to the present disclosure.

FIG. 2 is a diagram illustrating the system configuration of a collaborative filtering recommending apparatus according to the present disclosure.

Referring to FIG. 2, the collaborative filtering recommending apparatus 130 may include a processor 210, a memory 230, a user input-output unit 250, and a network input-output unit 270.

The processor 210 may execute a collaborative filtering recommending procedure based on the learnable-time ordinary differential equation according to the present disclosure, may manage the memory 230 which is read or written in this process, and may schedule a synchronization time between a volatile memory and a non-volatile memory in the memory 230. The processor 210 may control the overall operation of the collaborative filtering recommending apparatus 130, and may be electrically connected to the memory 230, the user input-output unit 250 and the network input-output unit 270 to control data flow between them. The processor 210 may be implemented as a Central Processing Unit (CPU) of the collaborative filtering recommending apparatus 130.

The memory 230 may include an auxiliary storage device which is implemented as a non-volatile memory such as a Solid State Disk (SSD) or a Hard Disk Drive (HDD) to store overall data required for the collaborative filtering recommending apparatus 130, and a main storage device which is implemented as a volatile memory such as a Random Access Memory (RAM). Further, the memory 230 may be executed by the processor 210 electrically connected thereto to store a set of instructions which execute the collaborative filtering recommending method based on the learnable-time ordinary differential equation according to the present disclosure.

The user input-output unit 250 may include an environment for receiving a user input and an environment for outputting specific information to the user, and may include, for example, an input device including an adapter such as a touch pad, a touch screen, an on-screen keyboard, or a pointing device, and an output device including an adapter such as a monitor or a touch screen. In an embodiment, the user input-output unit 250 may correspond to a computing device accessed through a remote access. In this case, the collaborative filtering recommending apparatus 130 may be performed as an independent server.

The network input-output unit 270 may provide a communication environment to be connected through a network to the user terminal 110, and may include an adapter for communication such as a Local Area Network (LAN), a Metropolitan Area Network (MAN), a Wide Area Network (WAN), or a Value Added Network (VAN), for example. Further, the network input-output unit 270 may be implemented to provide a short-range communication function such as WiFi or Bluetooth or a wireless communication function of 4G or higher for wireless data transmission.

Figure 3:
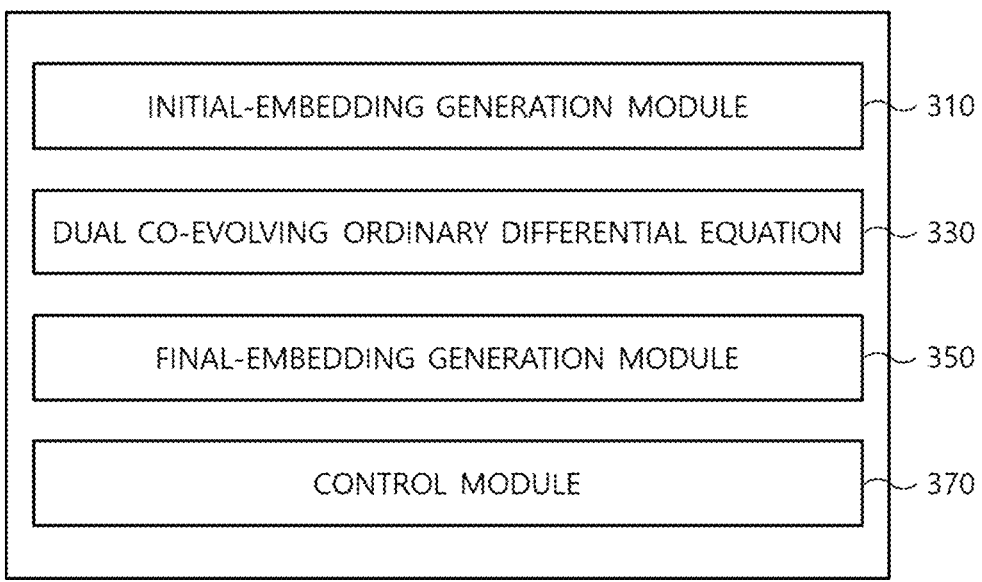
FIG. 3 is a diagram illustrating the functional configuration of the collaborative filtering recommending apparatus according to the present disclosure.

FIG. 3 is a diagram illustrating the functional configuration of the collaborative filtering recommending apparatus according to the present disclosure.

Figure 5A:
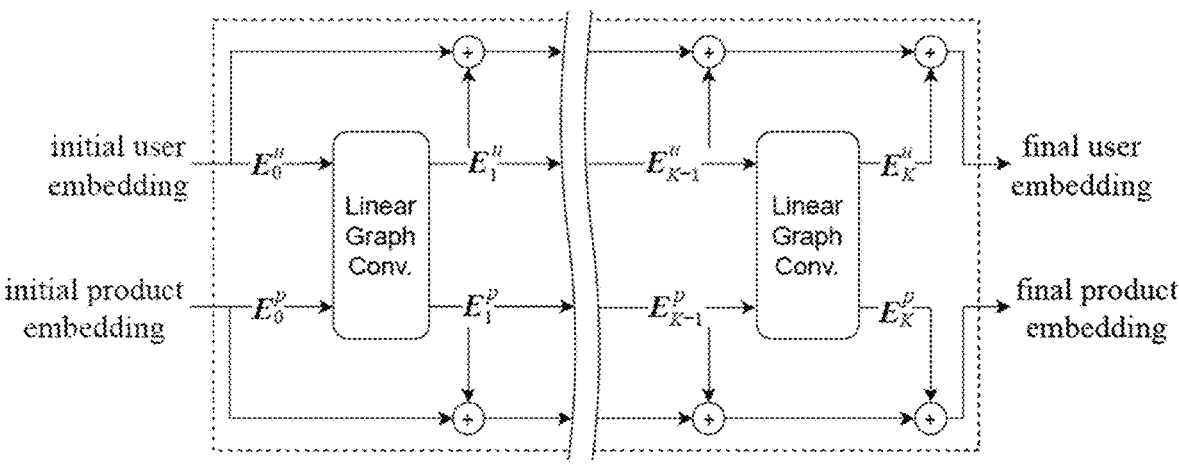
FIGS. 5A and 5B are diagrams illustrating the overall architectures of LightGCN and a method (LT-OCF) according to the present disclosure.
Figure 5B:
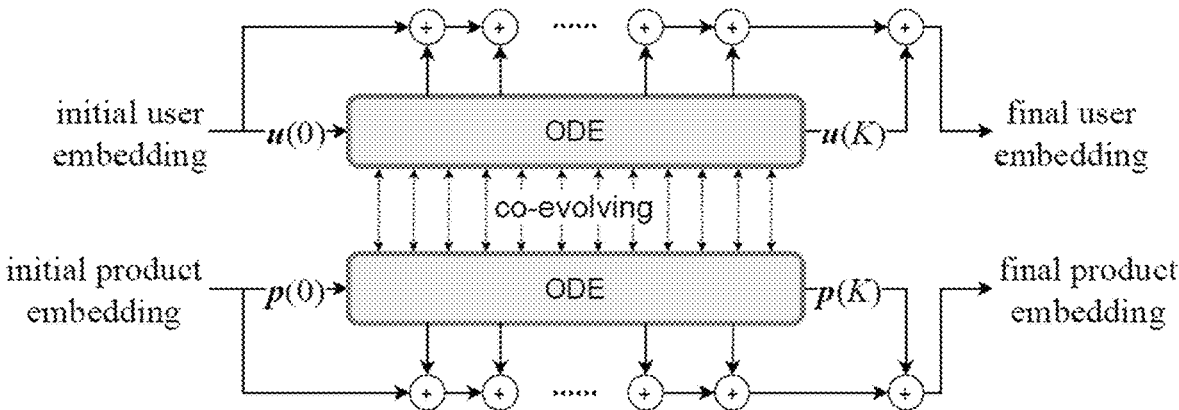

Referring to FIG. 3, the collaborative filtering recommending apparatus 130 may be implemented to include co-evolutionary ODEs for user and product embeddings based on a continuous and leanable time variable t. FIG. 5B shows the overall architecture of LT-OCF according to the present disclosure. The collaborative filtering recommending apparatus 130 may interpret the time variable t as a continuous layer variable in the process of implementing LT-OCF based on a double ODE layer. That is, LT-OCF may construct a more flexible architecture using the continuous characteristic of t, whereas LightGCN and existing GCN based CF methods may use predetermined discrete architectures. Further, LT-OCF may use any positive real numbers for t and those numbers are even trainable in the present disclosure.

As a logical configuration for this, the collaborative filtering recommending apparatus 130 may include an initial-embedding generation module 310, a dual co-evolving ordinary differential equation module 330, a final-embedding generation module 350, and a control module 370.

The initial-embedding generation module 310 may generate first and second initial embeddings. Here, the first and second initial embeddings may correspond to user and product embeddings, respectively. For example, the initial-embedding generation module 310 may generate $$E_0^u \text{ and } E_0^p$$

as the first and second initial embeddings to transmit them to a subsequent operation step. Thus, the first and second initial embeddings may be transmitted to the dual co-evolutionary ODEs, and may pass through the layer combination architecture according to the present disclosure to generate final embeddings.

The dual co-evolving ordinary differential equation module 330 may include first and second ordinary differential equation processing members which repeat, for a specific time, the process of receiving first and second previous embeddings, respectively, and outputting first and second subsequent embeddings, respectively, through mutual influence as the learning time elapses. In this regard, the first and second previous embeddings may initially correspond to first and second initial embedding, respectively. In other words, the first and second ordinary differential equation processing members may independently receive the user embedding and the product embedding in each iteration step, and then may perform the operation of generating embeddings for a next step through a predetermined operation.

In an embodiment, the dual co-evolving ordinary differential equation module 330 may output a user embedding matrix u(t) at a specific point in learnable-time as the first subsequent embedding. In an embodiment, the dual co-evolving ordinary differential equation module 330 may output a product embedding matrix p(t) at a specific point in learnable-time as the second subsequent embedding.

To be more specific, a co-evolutionary process performed by the dual co-evolving ordinary differential equation module 330 may be expressed as in the following Equation 9.

$$u(K) = u(0) + \int_0^K f(p(t))dt \qquad \text{[Equation 9]}$$

$$p(K) = p(0) + \int_0^K g(u(t))dt$$

where $u(t) \in \mathbb{R}^{N \times D}$ is a user embedding matrix at time t, and $p(t) \in \mathbb{R}^{M \times D}$ is a product embedding matrix at time t. Further, $f(p(t))$ may output $$\frac{du(t)}{dt},$$

and g(u(t)) may output $$\frac{dp(t)}{dt}.$$

In this case, $$u(0) = E_0^u \text{ and } p(0) = E_0^p$$

because the initial embedding is directly input into the ODE.

In an embodiment, the dual co-evolving ordinary differential equation module 330 may form a set of co-evolving ordinary differential equations with the user embedding matrix and the product embedding matrix. In other words, u(t) and p(t) may correspond to a set of ODEs which process co-evolving. With co-evolving, the user embedding may affect the product embedding, and the product embedding may affect the user embedding.

In an embodiment, the dual co-evolving ordinary differential equation module 330 may output a plurality of user embedding matrixes $(u(t_1), u(t_2), \ldots, u(t_n))$ and a plurality of product embedding matrixes $(p(t_1)p(t_2), \ldots, p(t_n))$ at a plurality of discrete times which may be set by a user. Thereby, the dual co-evolving ordinary differential equation module 330 may implement the learnable-time architecture according to the present disclosure.

To be more specific, the dual co-evolving ordinary differential equation module 330 may extract $u(t)$ and $p(t)$ by applying several learnable time points $t \in \{t_1, \ldots t_T\}$. Here, T is a hyperparameter, and $0 < t_i < t_{i+1} < K$ is for all i. Therefore, the above Equation 9 may be expressed as the following Equation 10.

$$u(t_1) = u(0) + \int_0^{t_1} f(p(t))dt$$

$$p(t_1) = p(0) + \int_0^{t_1} g(u(t))dt$$

$$\ldots$$

$$u(K) = u(t_T) + \int_{t_T}^{K} f(p(t))dt$$

$$p(K) = p(t_T) + \int_{t_T}^{K} g(u(t))dt$$

where $t_i$ is trainable for all i. In each equation, the first term of the right-hand side may be used to create the residual connection (cf. the residual connection 910 inside the ODE in FIG. 9).

In an embodiment, the dual co-evolving ordinary differential equation module may construct each of first and second ordinary differential equations as a non-parameterized and non-time-dependent ordinary differential equation. For example, two ODE functions $f$ and $g$ may be defined as in the following Equation 12, based on a recent linear graph convolution.

$$f(p(t)) = \overline{A}_{u \to p} p(t)$$

$$g(u(t)) = \overline{A}_{p \to u} u(t) \qquad \text{[Equation 12]}$$

where $\overline{A}$ is a symmetric normalized Laplacian matrix or a normalized adjacency matrix. LightGCN uses the latter, whereas the method according to the present disclosure based on a continuous thermal diffusive differential equation may use both of them. According to the above definition of Equation 12, the dual co-evolving ordinary differential equation module 330 may form non-parameterized and non-time-dependent ODEs. The reason is because ODE functions do not take t, $\theta_f$ and $\theta_g$ as inputs.

The final-embedding generation module 350 may generate a first final embedding by cumulative summing first previous and subsequent embeddings, and may generate a second final embedding by cumulative summing second previous and subsequent embeddings. That is, the final-embedding generation module 350 may generate the final embedding for each of the user embedding and the product embedding through the independent operation.

In an embodiment, the final-embedding generation module 350 may generate a first final embedding by weighted summing a plurality of user matrixes generated at a plurality of discrete times, and may generate a second final embedding by weighted summing a plurality of product matrixes generated at a plurality of discrete times. To be more specific, the final embedding generating operation performed by the final-embedding generation module 350 may be expressed as in the following Equation 11.

$$E^u_{final} = w_0 u(0) + \sum_{i=1}^{T} w_i u(t_i) + w_K u(K) \qquad \text{[Equation 11]}$$

$$E^p_{final} = w_0 p(0) + \sum_{i=1}^{T} w_i p(t_i) + w_K p(K)$$

An operation performed internally by the explicit Euler method is to generalize residual connections in a continuous manner. So, the final-embedding generation module 350 may extract intermediate ODE states (i.e. $u(t)$ and $p(t)$ in $t \in \{t_1, \ldots, t_T\}$), and may create a higher level of layer combination in the above Equation 11 corresponding to the dual residual connection (cf. the layer combination 930 outside the ODEs in FIG. 9).

On the other hand, when using other improved ODE solvers, connections inside the ODE may be more sophisticated (e.g. DenseNet or FractalNet connections when using RK4). FIG. 10 shows the internal and external connections in various solvers.

In addition, several linear GCNs may exist, and Light-GCN explains an analogy between various linear GCN models, and shows that many other linear models may approximate to a special case of LightGCN.

The following setting may be supposed in the method according to the present disclosure. i) $t_i$ may not be trained but be fixed to i for all i. ii) The explicit Euler method with its step size parameter s=1 may be used. iii) The residual connection may not be used but the linear connection inside the ODEs may be used. The settings may be expressed as in the following Equation 13.

$$u(1) = f(p(0)) \qquad \text{[Equation 13]}$$

$$p(1) = g(u(0))$$

$$\ldots$$

$$u(K) = f(p(K-1))$$

$$p(K) = g(u(K-1))$$

After that, the linear combination may yield $$E^u_{final} = \sum_{i=0}^{K} w_i u(t_i),$$

and $$E^p_{final} = \sum_{i=0}^{K} w_i p(t_i).$$

These final embeddings may be equivalent to the above Equation 6 because ODE functions $f$ and $g$ in the above Equation 12 are equivalent to the linear layer definition of LightGCN in the above Equation 5. Thus, the method according to the present disclosure may be equivalent to LightGCN under the specific setting. Therefore, the method according to the present disclosure, LT-OCF, may be considered as a continuous generalization of linear GCNs, including LightGCN and other models that may be approximated by LightGCN.

The control module 370 may control the overall operation of the collaborative filtering recommending apparatus 130, and may manage control flow or data flow between the initial-embedding generation module 310, the dual co-evolving ordinary differential equation module 330, and the final-embedding generation module 350.

Figure 4:
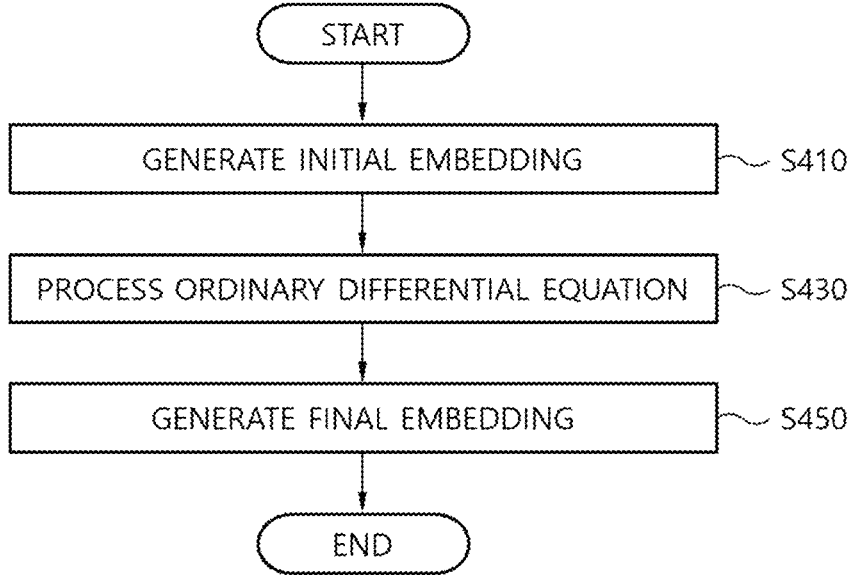
FIG. 4 is a flowchart illustrating a method for recommending learnable-time ordinary differential equation based collaborative filtering according to the present disclosure.

FIG. 4 is a flowchart illustrating a method for recommending learnable-time ordinary differential equation based collaborative filtering according to the present disclosure.

Referring to FIG. 4, the collaborative filtering recommending apparatus 130 may generate the first and second initial embeddings through the initial-embedding generation module 310 (step S410). The collaborative filtering recommending apparatus 130 may repeat, for a specific time, the process of receiving first and second previous embeddings, respectively, and outputting first and second subsequent embeddings, respectively, through mutual influence as the learning time elapses, through the first and second ordinary differential equation processing members through the dual co-evolving ordinary differential equation module 330 (step S430). The collaborative filtering recommending apparatus 130 may generate the first final embedding by cumulative summing the first previous and subsequent embeddings through the final-embedding generation module 350, and may generate the second final embedding by cumulative summing the second previous and subsequent embeddings (step S450).

Meanwhile, the collaborative filtering recommending apparatus 130 may include sophisticated techniques, and the training algorithm for it may be more complex than other cases. The collaborative filtering recommending apparatus 130 may train a model using a Bayesian Personalized Ranking (BPR) loss expressed as L, which is commonly used in many CF methods.

Further, the collaborative filtering recommending apparatus 130 may alternately train the co-evolving ODEs and their intermediate time points. When training for one, other parts may be fixed. This may make the gradient calculation by the adjoint sensitivity method simple because a fixed ODE/time point may be considered as constants at a moment of training time. The gradients of loss with regard to u(0), which is identical to the initial embedding $$E_0^u,$$

may be calculated via the reverse-mode integration as in the following Equation 14.

$$\frac{dL}{du(0)} = a_u(K) - \int_K^0 a_u(t)^T \frac{\partial g(u(t))}{\partial u(t)} \qquad \text{[Equation 14]}$$

$$\text{where } a_u(t) \overset{def}{=} \frac{dL}{du(t)}. \qquad \qquad$$

The gradients of loss with regard to p(0), i.e. the initial embedding of products may be calculated in the same way.

Further, in the case of using the adjoint sensitivity method, the calculation of the gradients may require a space complexity of O(1) and a time complexity of $$O\!\left(\frac{1}{s}\right),$$

where s is the average step-size of underlying ODE solver which is fixed for the Euler method and RK4 and varied for DOPRI Furthermore, the gradient of loss with regard to $t_i$ may not be involved in the adjoint sensitivity method but may be defined directly as in the following Equation 15.

$$\frac{dL}{dt_i} = \qquad \qquad \text{[Equation 15]}$$

$$\frac{\partial L}{\partial u(t_i)} \frac{du(t_i)}{dt_i} + \frac{\partial L}{\partial p(t_i)} \frac{\partial p(t_i)}{dt_i} = a_u(t_i)g(u(t_i)) + a_p(t_i)f(p(t_i))$$

where its complexity is O(T) to train all time-points.

FIG. 11 shows a training algorithm according to the present disclosure. The collaborative filtering recommending apparatus 130 may alternately train each part until the BPR loss converges.

The Cauchy-Kowalevski theorem states that, given $$f = \frac{dh(t)}{dt},$$

there exists a unique solution of h if $f$ is analytic (or locally Lipschitz continuous), i.e. the ODE problem may be frequently posed if $f$ is analytic. The collaborative filtering recommending apparatus 130 may use analytic matrix multiplications in the above Equation 12 to model $$\frac{du(t)}{dt} \text{ and } \frac{dp(t)}{dt}.$$

This implies that there will be only a unique optimal ODE for u(t), given fixed p(t) and vice versa.

Hereinafter, the experiments about the collaborative filtering recommending method according to the present disclosure will be described in detail with reference to FIGS. 12 to 16.

All experiments may be conducted in the following software and hardware environments: Ubuntu 18.04 LTS, Python 3.6.6, Numpy 1.18.5, Scipy 1.5, Matplotlib 3.3.1, PyTorch 1.2.0, CUDA 10.0, and NVIDIA Driver 417.22, i9 CPU, and NVIDIA RTX Titan.

First, three benchmark datasets of Gowalla, Yelp2018, and Amazon-Book are used without any modifications. The statistics for the datasets are shown in FIG. 12. Further, for a comparison, the following baselines may be used.

(1) MF is a matrix decomposition optimized by Bayesian Personalization Rank (BPR) loss, which utilizes the user-item direct interaction only as the target value of the interaction function.

(2) Neu-MF is a neural collaborative filtering method. This method uses multiple hidden layers above the element-wise concatenation of user and item embeddings to capture their non-linear feature interactions.

(3) CMN is a state-of-the-art memory-based model. This method may use first-order connections to find similar users who interacted with the same items.

(4) HOP-Rec is a graph-based model, which uses the high order user-item interactions by random walks to enrich the original training data.

(5) GC-MC is a graph auto-encoder framework based on differentiable message passing on the bipartite interaction graph. This method applies the GCN encoder on user-item bipartite graph and employs one convolutional layer to exploit the direct connections between users and items.

(6) Mult-VAE is a variational autoencoder-based CF method. A drop-out rate is $\{0, 0.2, 0.5\}$ and $\beta$ is $\{0.2, 0.4, 0.6, 0.8\}$. The layer-wise dimensionality is 600, 200, and then 600.

(7) GRMF is a matrix factorization method by adding the graph Laplacian regularizer. The original loss of GRMF is changed to the BPR loss for fair comparison. GRMG-norm is a variation from GRMF by adding a normalization to graph Laplacian.

(8) NGCF is a representative GCN-based CF method. It uses feature transformation and non-linear activations.

(9) LR-GCCF and LightGCN are linear GCN-based CF methods.

Further, two standard evaluation metrics, Recall@20 and NDCG@20 may be used with all ranking protocol. That is, all items that do not have any interactions with a user may be recommendation candidates.

Further, several common hyperparameters may be applied to the method according to the present disclosure and the above baseline models. Various embodiments may be applied according to the experimental environment and conditions, and models to be compared.

FIG. 13 shows the overall accuracy in terms of recall and NDCG. The non-linear GCN-based method, NGCF, may show good performance for a couple of cases in comparison with other non-GCNbased methods. Above all, LightGCN may show the state-of-the-art accuracy in all cases among all baselines. For example, it may sometimes outperform other methods by large margins, e.g., a recall of 0.1830 in Gowalla by Light GCN vs. a recall of 0.1641 by Multi-VAE. In general, the three GCN-base methods, NGCF, LR-GCCF, and LightGCN, may outperform other baseline methods by large margins.

However, the best accuracy may be marked by the method according to the present disclosure, LT-OCF (Learnable-Time ODE-based Collaborative Filtering), in all cases.

Figure 14:
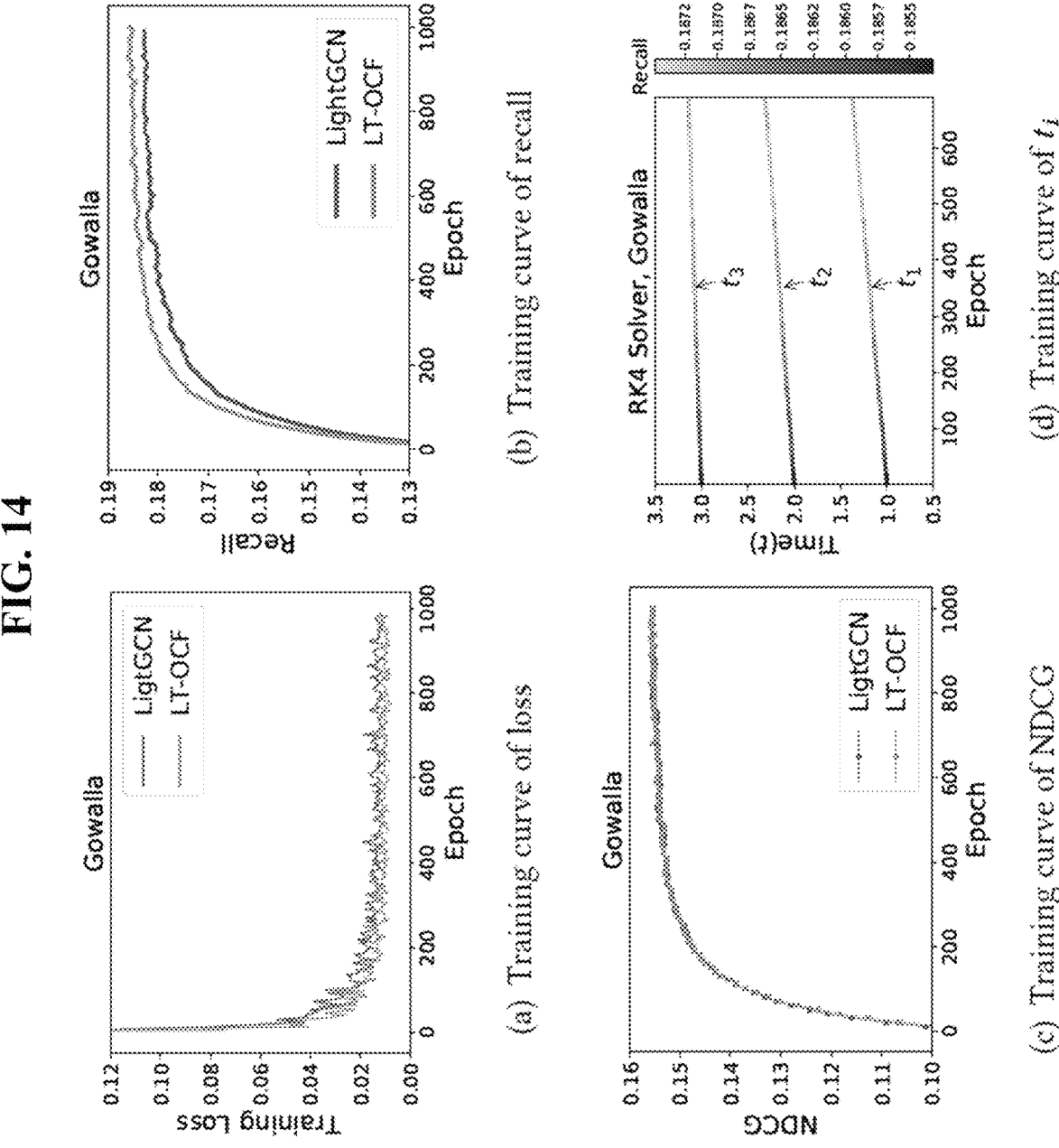
FIG. 14 is a diagram illustrating an experimental result for a Gowalla dataset.

FIG. 14 shows the training curve of LightGCN and LTOCF in Gowalla. In general, the method according to the present disclosure may provide a faster training speed in terms of the number of epochs than that of LightGCN. In FIG. 14D, it can be seen that $t_i$ becomes larger (with a little fluctuation) as training goes on. It is because the model according to the present disclosure prefers embeddings from deep layers when constructing the layer combination. $t_1$ may be more actively trained, and $t_3$ may not be trained much. According to this training pattern, it can be seen that it is more important to have reliable early layers for the layer combination.

Figure 15:
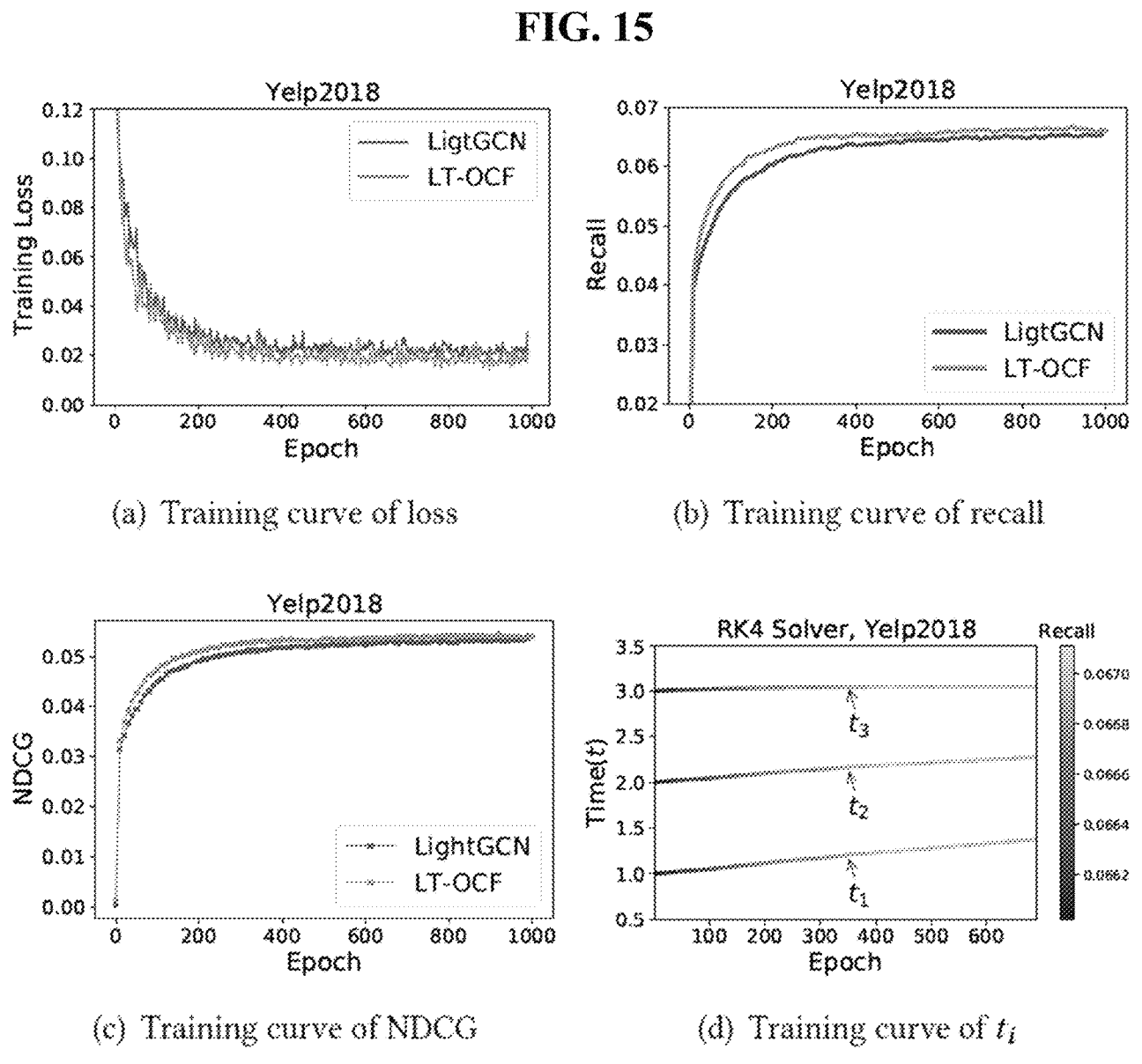
Figure 16:
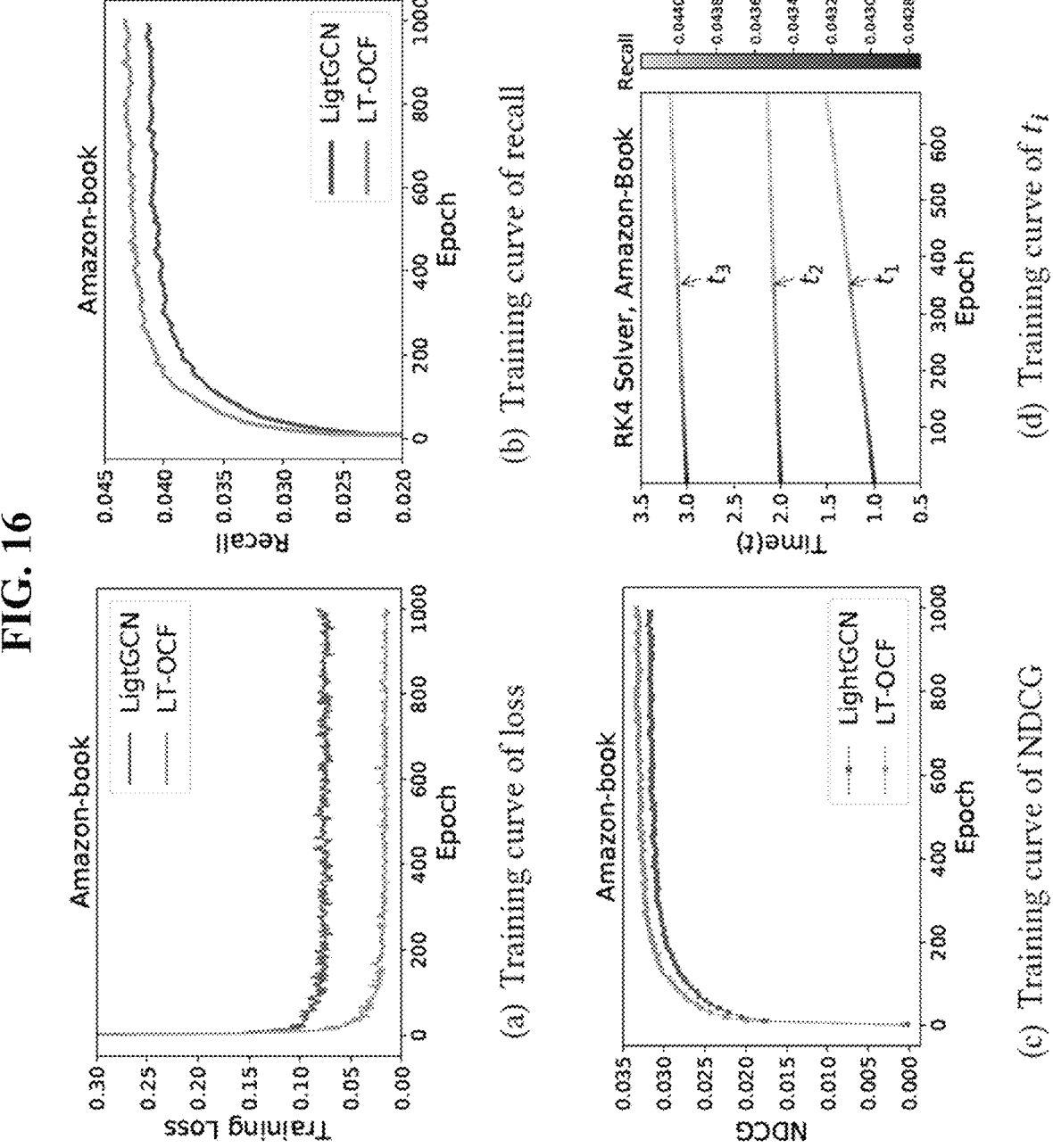
FIG. 16 is a diagram illustrating an experimental result for an Amazon-Book dataset.

FIGS. 15 and 16 show the results of the same experiment types for Yelp2018 and Amazon-Book. For Amazon-Book, LT-OCF shows remarkably smaller loss values than that of LightGCN as shown in FIG. 16A. In FIGS. 15B and 15C and FIGS. 16B and 16C, the method according to the present disclosure shows faster training for recall and NDCG than LightGCN. In FIG. 16D, $t_1$ may be trained much more than other cases in FIGS. 14D and 15D.

Although the present invention was described with reference to specific embodiments shown in the drawings, it is apparent to those skilled in the art that the present invention may be changed and modified in various ways without departing from the scope of the present invention, which is described in the following claims.

[Detailed Description of Main Elements]

100: collaborative filtering recommender system
110: user terminal
130: collaborative filtering recommending apparatus
150: database
210: processor
230: memory
250: user input-output unit
270: network input-output unit
310: initial-embedding generation module
330: dual co-evolving ordinary differential equation module
350: final-embedding generation module
370: control module

What is claimed is:

1. A collaborative filtering recommending apparatus based on a learnable-time ordinary differential equation, the apparatus comprising:
an initial-embedding generation module configured to generate first and second initial embeddings;
a dual co-evolving ordinary differential equation module comprising first and second ordinary differential equation processing members which repeat, for a specific time, a process of receiving first and second previous embeddings, respectively, and outputting first and second subsequent embeddings, respectively, through mutual influence as a learning time elapses, the first and second previous embeddings initially corresponding to the first and second initial embeddings, respectively; and
a final-embedding generation module configured to generate a first final embedding by cumulative summing the first previous and subsequent embeddings, and to generate a second final embedding by cumulative summing the second previous and subsequent embeddings,
wherein the process repeated by the dual co-evolving ordinary differential equation module for the specific time extracts a plurality of user embedding matrixes at a first set of time points and a plurality of product embedding matrixes at a second set of time points within a continuous time domain, wherein each time point is implemented as a learnable parameter stored in computer memory that is iteratively updated during training by:
(i) computing a gradient of a loss function with respect to the time point using an adjoint sensitivity method that performs reverse-mode integration through the neural ordinary differential equations; and
(ii) adjusting a numerical value of the time point stored in the memory based on the computed gradient, and
wherein the initial-embedding generation module, the dual co-evolving ordinary differential equation module, and the final-embedding generation module are each implemented via at least one processor.

2. The collaborative filtering recommending apparatus of claim 1, wherein the dual co-evolving ordinary differential equation module outputs the user embedding matrix (u(t)) at a specific point of the learnable-time as the first subsequent embedding.

3. The collaborative filtering recommending apparatus of claim 2, wherein the dual co-evolving ordinary differential equation module outputs the product embedding matrix (p(t)) at a specific point of the learnable-time as the second subsequent embedding.

4. The collaborative filtering recommending apparatus of claim 3, wherein the dual co-evolving ordinary differential equation module constructs a set of co-evolving ordinary differential equations with the user embedding matrix and the product embedding matrix.

5. The collaborative filtering recommending apparatus of claim 3, wherein the dual co-evolving ordinary differential equation module outputs a plurality of the user embedding matrixes (u(t_1), u(t_2), . . . , u(t_n)) and a plurality of the product embedding matrixes (p(t_1), p(t_2), . . . , p(t_n)) at a plurality of discrete times which is settable by a user.

6. The collaborative filtering recommending apparatus of claim 1, wherein the dual co-evolving ordinary differential equation module constructs each of first and second ordinary differential equations as a non-parameterized and non-time-dependent ordinary differential equation.

7. The collaborative filtering recommending apparatus of claim 1, wherein the final-embedding generation module generates the first final embedding by weighted summing a plurality of user matrixes generated at a plurality of discrete times, and generates the second final embedding by weighted summing a plurality of product matrixes generated at the plurality of discrete times.

8. A collaborative filtering recommending method based on a learnable-time ordinary differential equation, the method comprising:

an initial embedding generation step of generating first and second initial embeddings;

a dual co-evolving ordinary differential equation step of repeating, for a specific time, a process of receiving first and second previous embeddings, respectively, and outputting first and second subsequent embeddings, respectively, through mutual influence as a learning time elapses, through first and second ordinary differential equation processing members, the first and second previous embeddings initially corresponding to the first and second initial embeddings, respectively; and a final-embedding generation step of generating a first final embedding by cumulative summing the first previous and subsequent embeddings, and generating a second final embedding by cumulative summing the second previous and subsequent embeddings, wherein the process repeated by the dual co-evolving ordinary differential equation step for the specific time extracts a plurality of user embedding matrixes at a first set of time points and a plurality of product embedding matrixes at a second set of time points within a continuous time domain, wherein each time point is implemented as a learnable parameter stored in computer memory that is iteratively updated during training by:

(i) computing a gradient of a loss function with respect to the time point using an adjoint sensitivity method that performs reverse-mode integration through the neural ordinary differential equations; and (ii) adjusting a numerical value of the time point stored in the memory based on the computed gradient.

9. The collaborative filtering recommending method of claim 8, wherein the dual co-evolving ordinary differential equation step comprises outputting the user embedding matrix (u(t)) at a specific point of the learnable-time as the first subsequent embedding.

10. The collaborative filtering recommending method of claim 9, wherein the dual co-evolving ordinary differential equation step comprises outputting the product embedding matrix (p(t)) at a specific point of the learnable-time as the second subsequent embedding.

11. The collaborative filtering recommending method of claim 10, wherein the dual co-evolving ordinary differential equation step comprises constructing a set of co-evolving ordinary differential equations with the user embedding matrix and the product embedding matrix.

12. The collaborative filtering recommending method of claim 10, wherein the dual co-evolving ordinary differential equation step comprises outputting a plurality of the user embedding matrixes (u(t_1), u(t_2), . . . , u(t_n)) and a plurality of the product embedding matrixes (p(t_1), p(t_2), . . . , p(t_n)) at a plurality of discrete times which is settable by a user.

13. The collaborative filtering recommending method of claim 8, wherein the dual co-evolving ordinary differential equation step comprises constructing each of first and second ordinary differential equations as a non-parameterized and non-time-dependent ordinary differential equation.

14. The collaborative filtering recommending method of claim 8, wherein the final embedding generation step comprises generating the first final embedding by weighted summing a plurality of user matrixes generated at a plurality of discrete times, and generating the second final embedding by weighted summing a plurality of product matrixes generated at the plurality of discrete times.

* * * * *